Dec. 9, 1947.                N. STEVENS                2,432,457
                            REPAIR DEVICE
                         Filed Feb. 13, 1945
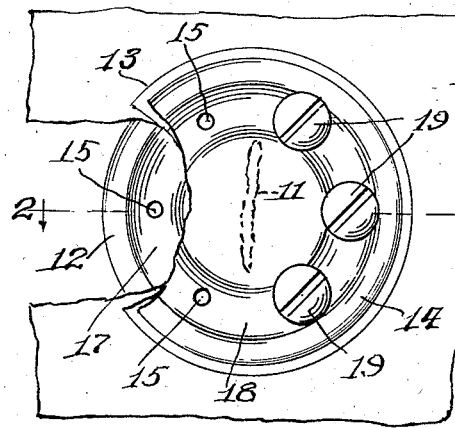
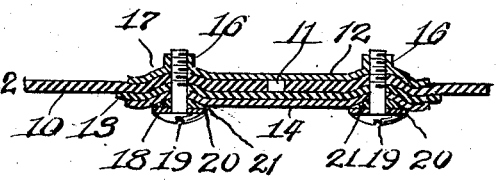
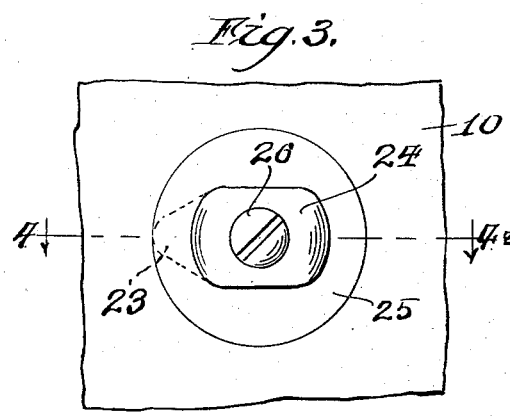
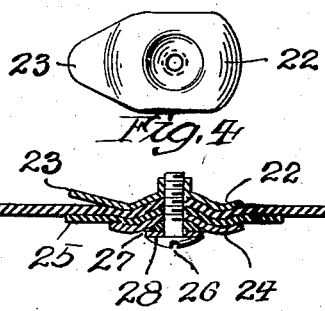
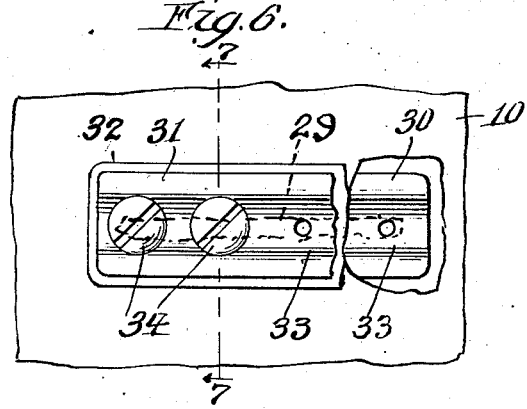
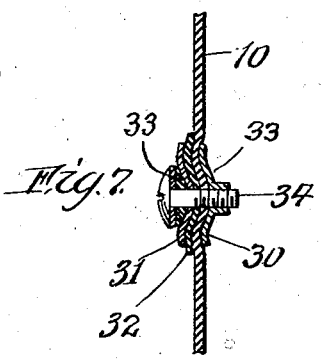
INVENTOR.
Nichols Stevens
BY
his Atty.

Patented Dec. 9, 1947

2,432,457

UNITED STATES PATENT OFFICE 2,432,457

REPAIR DEVICE

Nichols Stevens, Chicago, Ill.

Application February 13, 1945, Serial No. 577,711

6 Claims. (Cl. 152—369)

This invention relates to a repair device for repairing inner tubes and other rubber articles, and its principal object is the provision of a simple and efficient repair device which can be readily applied to the article to seal a puncture or cut therein against the escape of air or other fluid.

Another object is the provision of an inner tube repair device which may be quickly applied to a tube without the use of tools other than a screw driver.

Another object is the provision of a tube repair device which is positive in action, and effectively prevents leakage of air through a puncture or cut.

Other objects and advantages will appear in the course of this specification and with said objects and advantages in view this invention consists in the several novel features hereinafter fully described and more particularly defined in the appended claims.

The invention is clearly illustrated in the drawing accompanying this specification, in which:

Fig. 1 is a side elevation of a fragment of the inner tube of a tire, with one of the repair devices embodying one form of the present invention, applied thereto;

Fig. 2 is a section taken on the line 2—2 of Fig. 1.

Fig. 3 is a side elevation of a fragment of an inner tube with a modified form of the invention applied thereto;

Fig. 4 is a section taken on the line 4—4 of Fig. 3;

Fig. 5 is a face view of the inner disc shown in Figs. 3 and 4;

Fig. 6 is a side elevation of a fragment of an inner tube with a second modified form of the invention applied thereto; and Fig. 7 is a section taken on the line 7—7 of Fig. 6.

Referring to said drawing, and first to Figs. 1 and 2, the reference character 10 designates a fragment of an inner tire tube, which has a cut or puncture 11, therein.

12 designates an inner metal disc, which has been inserted into the interior of the tube through the puncture. On the outside of the tube is placed a washer 13 of rubber or other pliable composition, and upon the washer is placed a companion metal disc 14. The two discs and washer have registering screw holes 15 therein.

The inner disc is extruded around the screw holes as at 16 and is internally screw threaded. Along the screw holes, both discs are struck up to form annular shallow depressions 17, 18 curved in cross section, which serve to bend the tube along the screw holes into a channel or trough-like form.

Screws 19 are employed to clamp the members of the repair device firmly upon the tube. These screws extend through the outer disc 14, the washer 13, the tube 10 and inner disc 12, and are threaded in the inner disc. Under the head of each screw is a thin metal washer 20, and between each metal washer and the outer disc is a rubber washer 21 which is compressed into the depression in the disc, thereby preventing leakage of air around the screw.

The device is applied to an inner tire tube by first inserting the inner disc through the cut in the tube, holding it in place, puncturing the tube at places registering with the screw holes in the inner disc, placing the rubber washer on the tube with the screw holes in registry with those of the inner disc, placing the outer disc upon the washer, with the screw holes in registry with the others, and inserting the screws through the screw holes, with the small rubber and metal washers on the screws and screwing the screws up tight, thereby firmly clamping the inner tube between the inner disc and pliable washer.

Round headed screws are preferable because they do not injure the tire casing with which they contact. The metal discs are constructed of flexible thin metal, preferably brass, so that they may flex as the tire travels over the road.

The form of the invention illustrated in Figs. 1 and 2 is intended for use on relatively large cuts or punctures. The modified form illustrated in Figs. 3, 4 and 5 is intended for use in repairing relatively small punctures. In this form the inner disc 22 may have an elongated, blunt pointed end 23 which serves as a handle whereby to hold said inner disc in place while assembling the parts. As in the preferred form there is an inner disc 22, an outer disc 24, a rubber washer 25 between the tube and outer disc, a single screw 26 and rubber and metal washers 27, 28. A single screw hole is formed in the discs and washer 25, and the inner disc is extruded around the screw hole to provide for the internal threads in the inner disc. Both discs are dished inwardly on spherical lines. This form of the device is applied to the tube in the same manner as has been explained in connection with the preferred form.

The modified form shown in Figs. 6 and 7 is intended for use on tubes having a relatively long cut 29 therein. In this form elongated inner and outer metal strips 30, 31 are employed which are of a length to completely cover the cut. Between the tube and outer metal strip is an elongated rubber washer 32. The inner and outer metal strips and washer are formed with several screw holes, along which the metal of the disc is struck up to form channel or trough like depression 33 and the inner metal strip is extruded around the screw holes to provide for the internal threads on the inner strip. Screws 34, with rubber and metal washers are used to clamp the device upon the tube as in the other forms.

While the discs are described as formed of metal it is obvious that they may be formed of plastic or other hard material.

It will be seen that in the several forms shown, the metal of the inner and outer discs and strips adjacent the depressions is reversely curved with respect to the depressed portions. This avoids any sharp bends being formed in the tube which might cause breakage or tearing of the tube.

What I claim as new and desire to secure by Letters Patent is:

1. A repair device comprising inner and outer flexible plates, both formed with at least one screw hole, the inner plate being threaded around the screw hole therein and the material of said plates around the screw hole being dished inwardly, a pliable washer adapted to be placed between a rubber article and the outer plate, and at least one screw, with rubber and metal washers thereon adapted to clamp the plates and pliable washer upon the article.

2. An inner tube repair device comprising inner and outer flexible discs, both formed with at least one screw hole, the inner disc being threaded around the screw hole therein, and the material of said discs around the screw hole being dished inwardly, a pliable washer adapted to be placed between an inner tube and the outer disc, and at least one screw, with rubber and metal washers thereon adapted to clamp the plates and pliable washer upon the tube.

3. An inner tube repair device comprising inner and outer flexible elongated strips, both formed with registering screw holes, the inner elongated strip being threaded around the screw holes therein, and the material of said elongated strips along the screw holes being depressed inwardly, a pliable washer adapted to be placed between an inner tube and the outer elongated metal strip, and screws, with rubber and metal washers thereon adapted to clamp the plate and pliable washer upon a tube.

4. An inner tube repair device comprising inner and outer flexible metal discs, both formed with registering screw holes, the inner disc being threaded around the screw holes therein, and the metal of said discs along the screw holes being depressed inwardly, a pliable washer adapted to be placed between an inner tube and the outer disc, and screws, with rubber and metal washers thereon adapted to clamp the discs and pliable washer upon a tube.

5. An inner tube repair device comprising inner and outer flexible metal elongated metal strips, both formed with registering screw holes, the inner elongated metal strip being threaded around the screw holes therein, and the metal of said elongated metal strips along the screw holes being depressed inwardly, and the side edge portions being reversely curved, a pliable washer adapted to be placed between an inner tube and the outer elongated metal strip, and screws, with rubber and metal washers thereon adapted to clamp the strips and pliable washer upon a tube.

6. An inner tube repair device comprising inner and outer flexible discs, each formed with a screw hole, the metal of the inner disc being extended around the screw hole and being internally screw threaded, and the material of both discs being dished inwardly, a pliable washer adapted to be placed on an inner tube and the outer disc, a screw with a rubber washer and a metal washer thereon, between the head of the screw and outer discs, said screw being adapted to clamp the discs and pliable washer upon the tube.

NICHOLS STEVENS.

REFERENCES CITED

The following references are of record in the file of this patent:

UNITED STATES PATENTS

| Number | Name | Date |
|---|---|---|
| 776,697 | Sieverling | Dec. 6, 1904 |
| 797,387 | Vigneron | Aug. 15, 1905 |
| 852,986 | Stevens | May 7, 1907 |
| 1,064,643 | Harris | June 10, 1913 |
| 1,294,322 | Swint | Feb. 11, 1919 |